United States Patent [19]

Eberhardt

[11] Patent Number: 4,503,618
[45] Date of Patent: Mar. 12, 1985

[54] PLAQUE ALIGNMENT TOOL

[76] Inventor: Roland C. Eberhardt, 564 W. 39th St., San Pedro, Calif. 90731

[21] Appl. No.: 431,041

[22] Filed: Sep. 30, 1982

[51] Int. Cl.³ .............................................. G01B 5/00
[52] U.S. Cl. .................... 33/180 R; 33/430; 33/184.5
[58] Field of Search ................. 33/180 R, 184.5, 430, 33/436, 437, 1 A, 1 AA, 174 R

[56] References Cited

U.S. PATENT DOCUMENTS

| 121,026 | 11/1971 | Briesen | 33/447 |
|---|---|---|---|
| 1,139,984 | 5/1915 | Leethem | 33/184.5 X |
| 1,142,105 | 6/1915 | Lake | 33/184.5 |
| 1,665,842 | 4/1928 | Brunings | 33/184.5 |
| 1,956,917 | 5/1934 | Fritsche | 33/184.5 |
| 2,034,350 | 3/1936 | Mario | 33/447 |

Primary Examiner—Harry N. Haroian
Attorney, Agent, or Firm—John Holtrichter, Jr.

[57] ABSTRACT

There is herein described a tool for accurately aligning a plurality of plates on a plaque board, the tool including a plurality of plate-holding finger members adjustably positionable along an elongated arm member which is itself adjustably positionable along a pivotal portion of an elongated guide member, the arm member along with its finger members being pivotally movable upwardly to facilitate the placement and replacement of plate boards on a base plate of the tool without the danger of scratching the boards.

7 Claims, 10 Drawing Figures

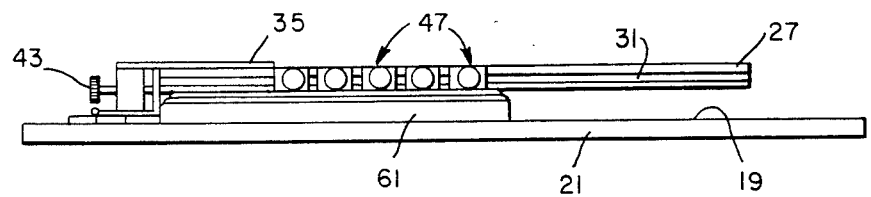
Fig. 6.
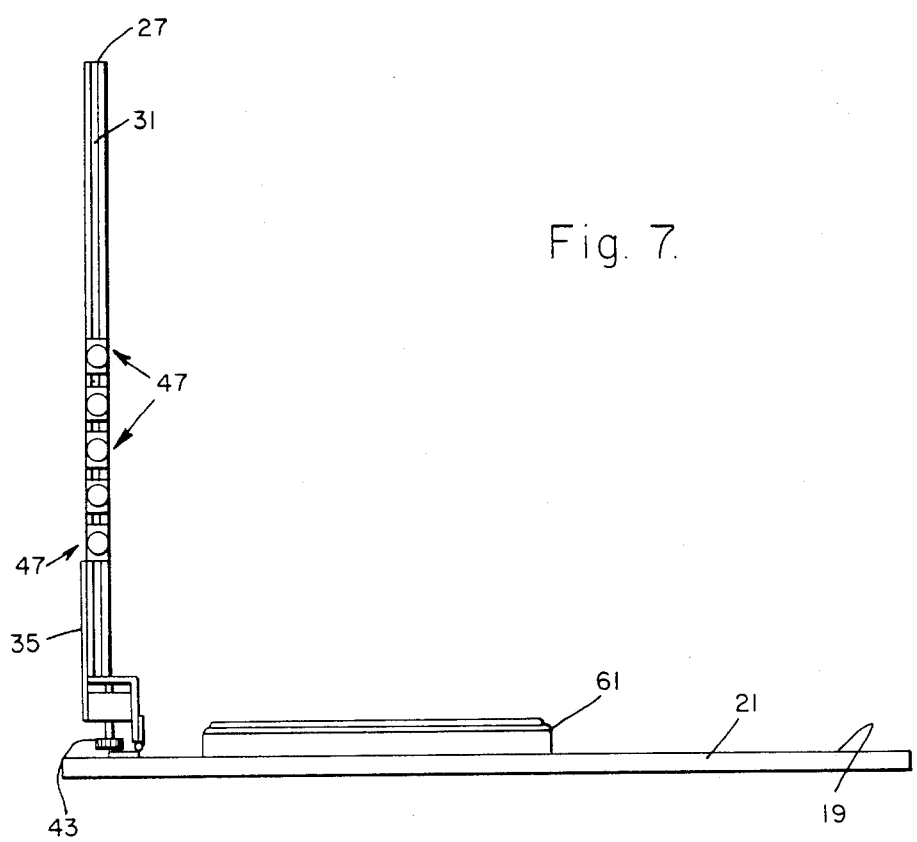
Fig. 7.
Fig. 8.  Fig. 9.
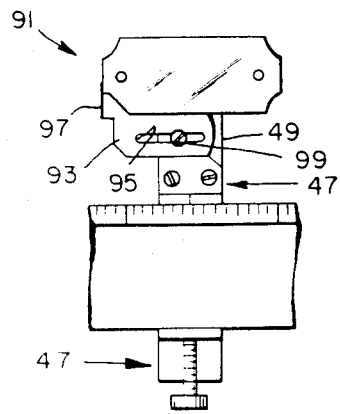 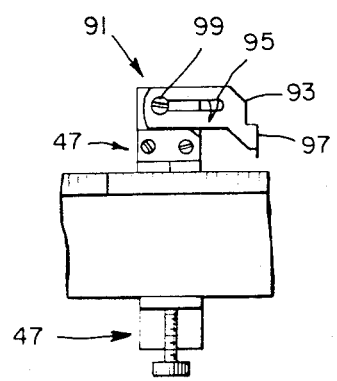

PLAQUE ALIGNMENT TOOL

TECHNICAL FIELD

This invention relates to the plaque manufacturing field and more particularly to tools utilized to aid in the alignment of plates being mounted on plaque boards.

BACKGROUND ART

Over the years, many means have been developed for the placement of a plurality of either plain or engraved or otherwise decorated plates on a plaque board in such a manner that the plates are aligned in straight columns and rows.

These techniques are used to assure that the alignment is as nearly perfect as can be obtained in order to present a plaque that is pleasing to the eye.

In the past, templates have been used to provide the desired aesthetic results. The template is fabricated by carefully measuring the plaque face and the plates to be attached thereto. Then, by the use of mathematics, the space available is divided up to provide the correct number of rows and columns and the layout is drawn on the template. Guided by the lines drawn on the template, cut outs are made in the template of the size and shape of the plates to be attached to the surface of the plaque board. The template is then attached to one board after another and the plates attached by using screws or drive pins or by placing an adhesive material to at least one of the mating surfaces and the plates pressed into the cut outs to provide the desired uniform result.

It should be quite clear that the use of this technique is quite time consuming, tedious, and requires a new template for each different plate and plaque board. Also, it is impossible to make even slight adjustments to the layout once the template has been made.

From this background description, it should be evident that a new technique which allows for a relatively simple and quick means for aligning plates to be attached to plaque boards and which may be easily adjusted at any time would constitute a significant advancement in the art.

SUMMARY OF THE INVENTION

In view of the foregoing factors and conditions characteristic of the prior art, it is the primary object of the present invention to provide a new and improved plaque alignment tool.

Another object of the present invention is to provide a reliable yet simple and adjustable plaque alignment tool.

Still another object of the present invention is to provide a plaque alignment tool which is easy to operate, yet accurate in the placement of decorative plates on plaque surfaces.

In accordance with an embodiment of the present invention, a plaque alignment tool for aligning plates on a plaque board includes a planar base member and an elongated guide member pivotally mounted on the base member, the pivotal axis being parallel to the longitudinal axis of the guide member. Also included is an elongated arm member movably attachable along the length of the pivotal portion of the guide member while maintaining an orthogonal relationship between its longitudinal axis and that of the guide member. Further, the invention includes a plurality of elongated plate-holding finger members each independently movably attachable along the length of the arm member while maintaining an orthogonal relationship between its longitudinal axis and that of the arm member.

The invention may also include work piece stop members which are movably attachable along the length of the pivotal portion of the guide member.

The features of the present invention which are believed to be novel are set forth with particularity in the appended claims. The present invention, both as to its organization and manner of operation and use together with further objects and advantages thereof, may best be understood by making reference to the following description taken in conjunction with the accompanying drawings in which like reference characters refer to like elements in the several views.

BRIEF DESCRIPTION OF THE DRAWINGS

FIG. 6 is an elevational view of the plaque alignment tool of FIG. 1 shown with its arm member in its horizontal position;

FIG. 7 is an elevational view of the tool shown in FIG. 5, but showing the arm member in its raised position; and FIGS. 8, 9 and 10 are plan views of a portion of a finger member showing another embodiment of the invention.

DESCRIPTION OF THE PREFERRED EMBODIMENT

Figure 1:
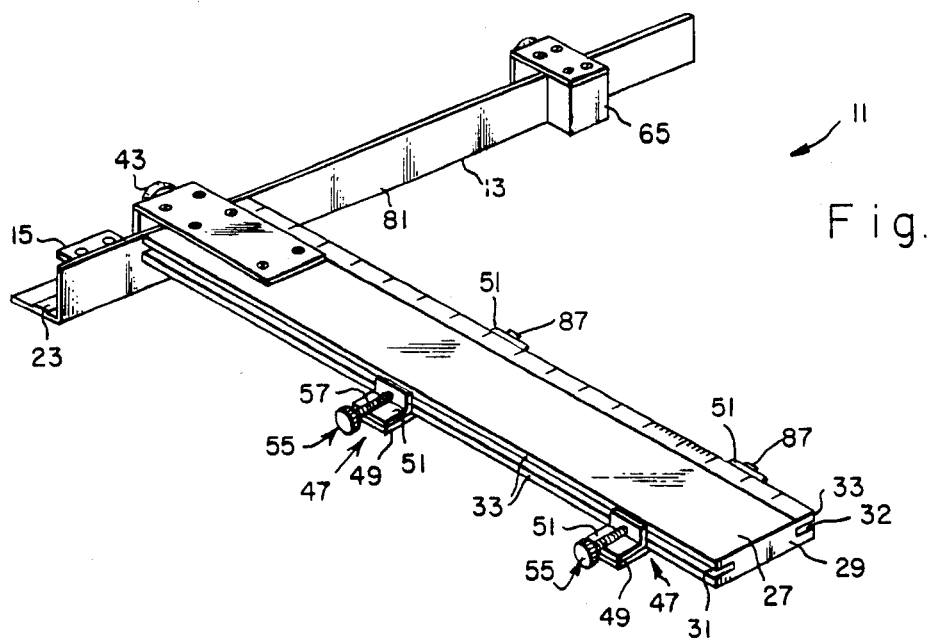
FIG. 1 is a perspective illustration of a plaque alignment tool capable of making it a simple task to accurately attached a plurality of aligned plates to a plaque board surface, in accordance with the present invention.
Figure 2:
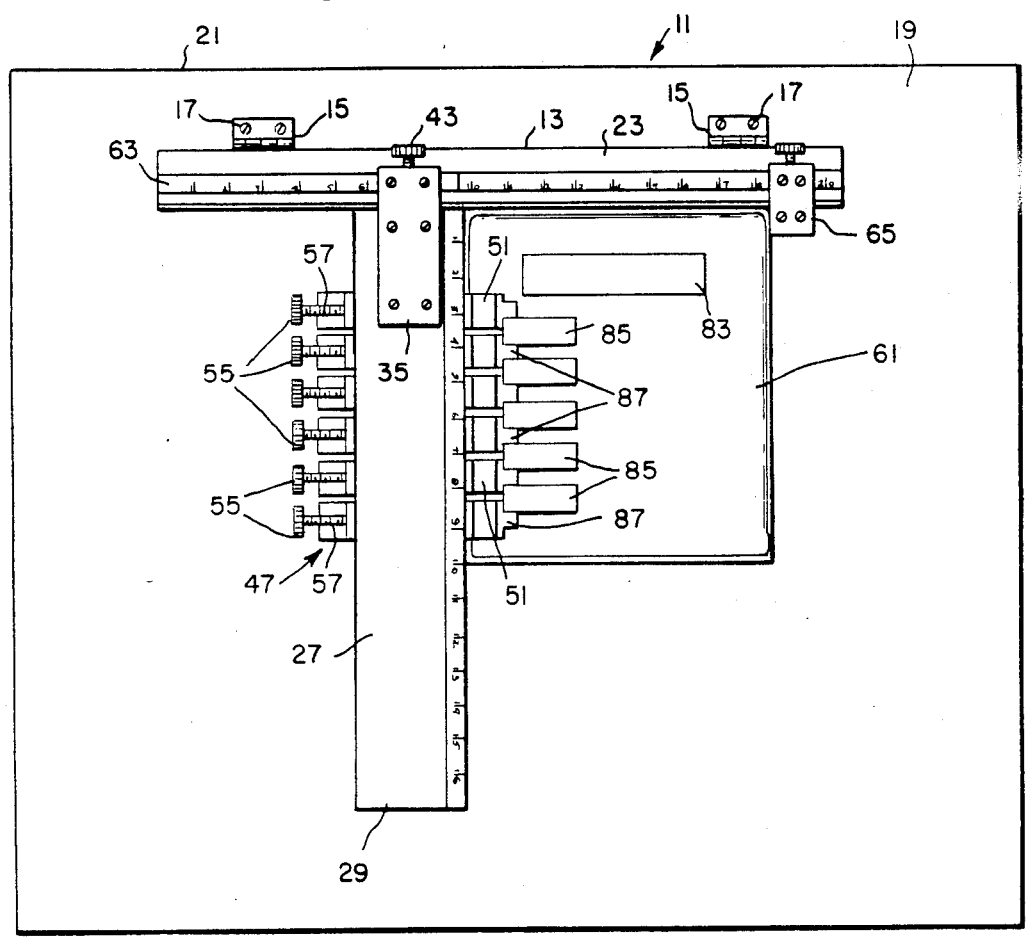
FIG. 2 is a plan view of the plaque alignment tool of FIG. 1 attached to a base member.

Referring now to the drawings and more particularly to FIGS. 1 and 2, there is shown a plaque alignment tool 11 for aligning plates on a plaque board or work piece. As can be seen in these figures, the invention includes an elongated guide member 13 mounted by means of a hinge assembly 15 and ordinary screws 17, for example, to an upper surface 19 of a planar base member 21. The guide member 13 also includes an elongated pivotal portion 23, the pivotal axis of which is parallel to the longitudinal axis of the guide member 13.

Figure 3:
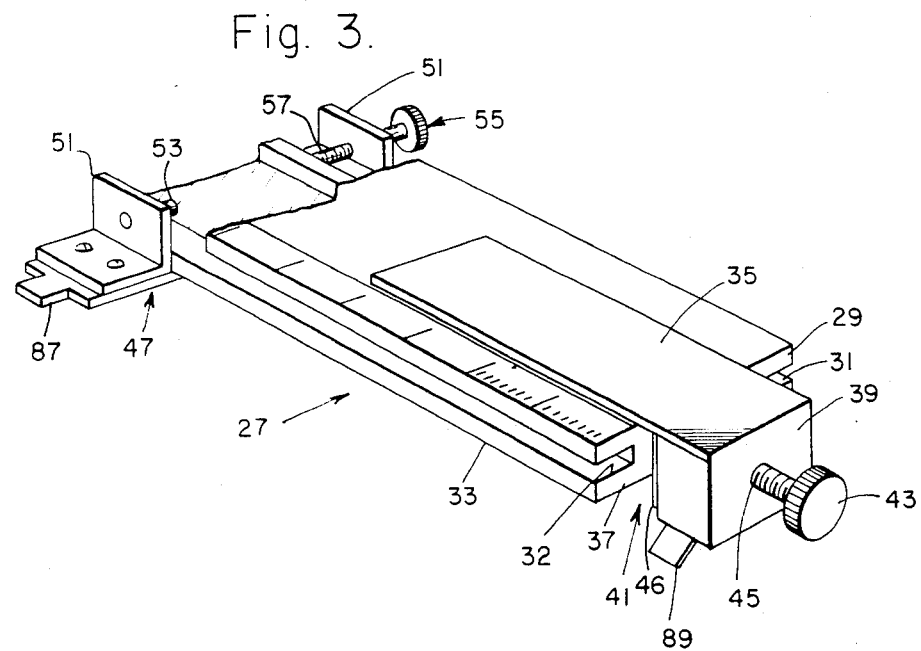
FIG. 3 is an enlarged perspective view of the arm member shown in FIG. 1.

An elongated beam or arm member 27 is movably attachable along the length of the pivotal portion 23 of the guide member while maintaining an orthogonal relationship between its longitudinal axis and that of the guide member 13. As is more clearly shown in FIG. 3, the arm member in this embodiment geerally consists of a main body portion 29 having side grooves 31 and 32 extending inwardly at both longitudinal edges 33, an upper plate 35 extending beyond an inner end surface 37 of the body portion 29, and an end block portion 39.

The arm member 27 is attached to the pivotal portion 23 of the guide member 13 by means of placing an end groove 41 (defined by the end surface 37, the inner surface of the upper plate 35, and an inner surface of the end block portion 39), over the upraised pivotal portion 23 and held in any temporarily desired position along the guide member 13 by means of a locking screw arrangement 43 having a threaded shaft portion threadably engaged in a taped hole 45 at the upper end of the block portion 39. Also provided is a bearing gib 46 located to extend between the upraised pivotal portion 23 and the end of the shaft portion 43 in order to prevent gouging of the portion 23 when the arrangement 42 is tightened.

Figure 4:
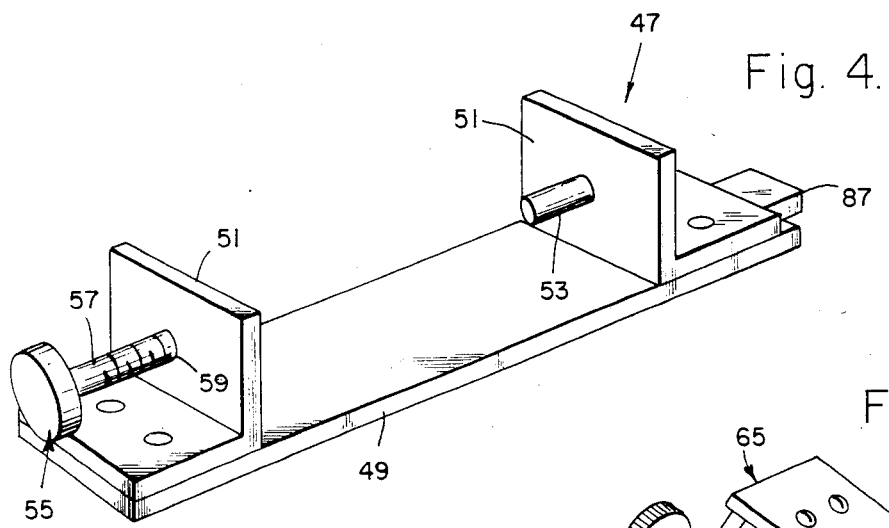
FIGS. 4 and 5 are enlarged perspective views of the finger and stop members, respectively, shown in FIG. 1.

Further included in the invention are a plurality of elongated plate-holding finger members 47 (see FIG. 4), each independently movably attachable along the length of the arm member 27 while maintaining an orthogonal relationship between its longitudinal axis and that of the arm member. Each finger member 47 has a lower bar portion 49 which slides along the lower surface of the arm member. The finger member also includes a pair of angle bracket portions 51, one of which has an inwardly extending pin 53 and a knob 55 with a threaded shaft portion 57 threadably engaged in a taped hole 59 in the bracket portion 51 and extending toward the pin 53. The pin 53 and the shaft portion 57 extend into the repsective grooves 31 in the arm member 27 so that the finger member may be placed and temporarily fixedly attached where desired along the arm member. In order to prevent gouging of the inner surface of the groove 31 by the end of the shaft portion 57, a steel clamping rail 60 is located in the inner surface of the groove 31.

Still further, the diameters of the shaft portion 57 and opposing pins 53 are such with respect to the height of the grooves 31 and 32 that the individual finger members 47 may be locked into position in light contact with the upper surface of a workpiece board even though individual ones of such boards may very somewhat in thickness.

Figure 5:
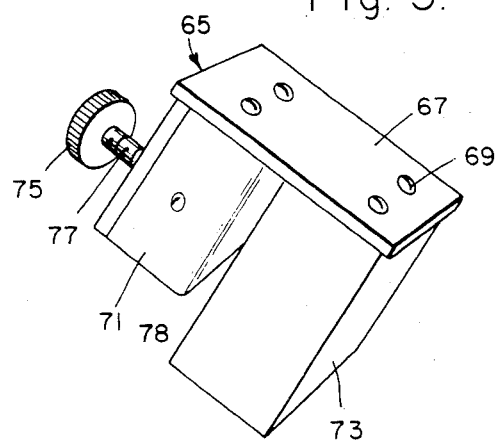

In operation, a plaque board 61 of a desired dimension is placed on the upper surface 19 of the base member 21 and aligned as desired, with an elongated scale 63 provided on the guide member 13. A stop member 65, which is shown in detail in FIG. 5, may be used to allow the user to easily duplicate the plaque layout on any number of boards. Most often, the elongated guide member 13 is oriented vertically to the left side and the arm member is horizontal when used in order to prevent the plates from sliding before being attached to the board.

The stop member 65 in this embodiment includes a top plate 67 attached by screws 69, for example, a short rear block 71 and a forward block 73. An adjustment locking screw 75 with a threaded shaft 77 and an associated bearing gib 78 is used to hold the stop member 65 in place. The slot, defined by the adjacent inner surfaces of the black 71 and block 73, is placed over the upraised portion 81 of the guide member pivotal portion 23 and the knob portion of the locking screw 75 turned until the inner end of the shaft 77 pushes on the bearing gib plate which in turn presses on the outer surface of the portion 81.

Once the plaque board 61 is positioned, a central plate 83, if such is desired, may be attached by a suitable adhesive, screws or drive pins to the surface of the board. Then, for example, by visually dividing up the lateral surface of the board to accommodate the desired number of rows and columns of plates 85, the finger members 47 are moved along the arm member 27 so that each plate 85 is held by adjacent finger member tips 87, as shown in FIG. 2. When in position, the knobs 55 are turned to temporarily lock the finger members in place along the arm 29. The individual plates 85 may then be fixed in place by an adhesive or conventional screws or drive pins.

Now, the arm member 29, along with the finger members 47, are lifted above the workpiece 61 from an original position shown in FIG. 6 to a position similar to that shown in FIG. 7, above the workpiece. The knob of the screw arrangement 43 may then be turned to release the arm from its present position so that it can be moved laterally to a new position to layout another row of plates 85. To aid in this positioning, the scale 63 may be used in conjunction with a pointer tab 89 provided at that portion of the arm member 27 adjacent the scale. Once the desired position is found, the knob is again rotated to lock the arm member in its new desired position.

The arm member is now lowered over the board 61 and a new set of plates 85 is placed betwen the tips 87 of the finger members. This sequence may then be repeated for each row of the plates. Of course, where a number of similar plaques are to be fabricated, each board may first be populated with one row of plates before the arm member 27 is moved to a new row location. Again, it should be noted that the lower surface of the finger member's lower bar portion is adjustable to lie just at or slightly above the upper surface of the plaque board so that, with the arm pivoting feature, there is no danger of scratching the board.

Figure 10:
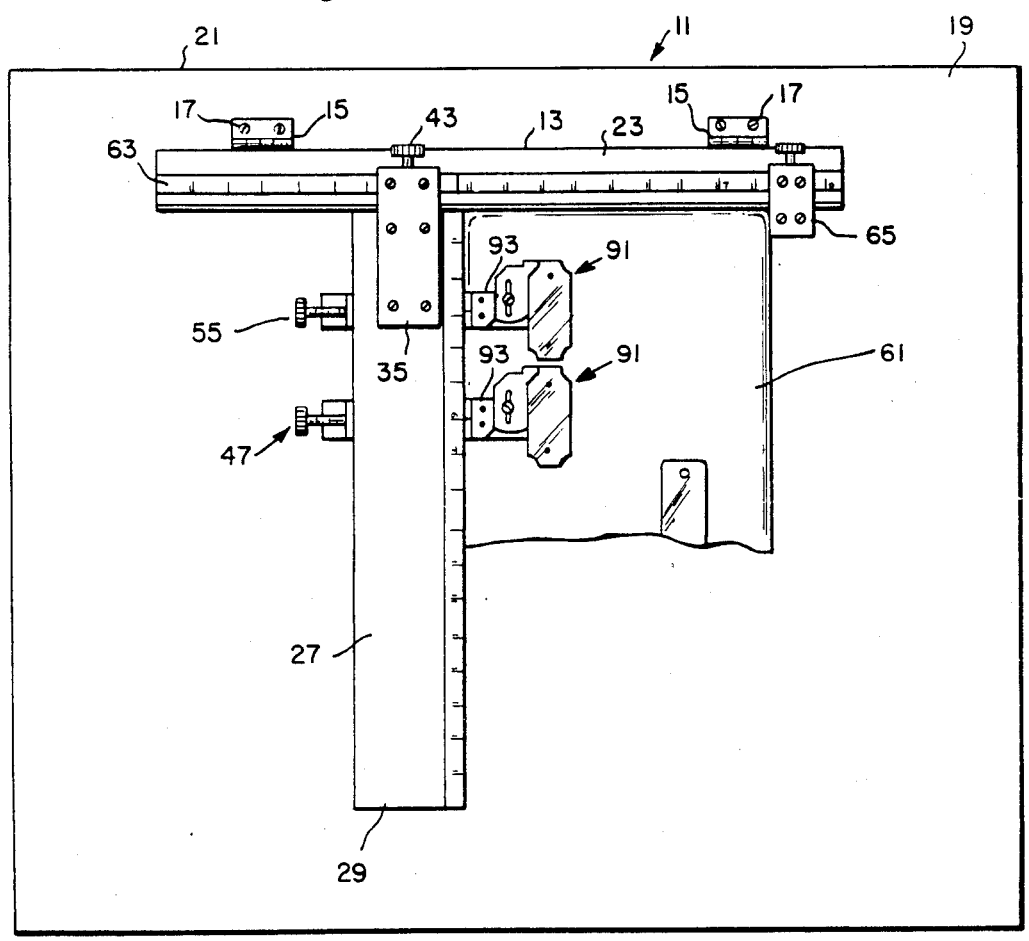

Referring now to FIGS. 8, 9 and 10, there is shown an alternative finger member configuration 91. Here, the tips 87 of the previous embodiment are replaced by a register plate 93 having an elongated slot 95 and a finger tip 97 with a downwardly extending tab portion at the end thereof. The plate 93 is held in position by a screw 99 extending through the slot 95 and into a threaded hole in the outer extending portion of the lower bar portion 49 of the finger member 47. In the finger member orientation shown in FIG. 8, each finger member holds in position a single plate 85, the configuration allowing a very close abutting relationship between adjacent plates 85. Alternately, the screws 99 may be loosened to allow the plates 93 to be rotated to the configuration shown in FIG. 9, before the screws are again tightened to lock the plates 93 in place. This configuration may be used where a large single plaque plate 85 is to be supported to the right of another finger member which is holding the left side of the plate 85.

From the foregoing it should be evident that there has herein been described a new and improved plaque alignment tool which is simple to operate but accurate in the placement of plates on a plaque board.

What is claimed is:

1. A plaque alignment tool for aligning plates on a plaque board, and the like, the tool comprising:

an elongated guide member fixedly mountable on a planar base member and having an elongated stationary portion and an elongated pivotal portion, the pivotal axis being parallel to the longitudinal axis of said guide member; an elongated arm member movably attachable along the length of said pivotal portion of said guide member while maintaining an orthogonal relationship between its longitudinal axis and that of said guide member;

a plurality of elongated plate-holding finger members each independently movably attachable along the length of said arm member while maintaining an orthogonal relationship between its longitudinal axis and that of said arm member; and a plate stop member movably attachable along the length of said pivotal portion of said guide member.

2. The plaque alignment tool according to claim 1, wherein each of said finger members includes a plate-registering notched outer end.

3. The plaque alignment tool according to claim 2, wherein each of said finger members includes an adjustable position-fixing mechanism at the end of each finger member opposite said outer end.

4. The plaque alignment tool according to claim 3, wherein said arm member includes an elongated side notch with a gouge-preventing elongated hardened strip disposed within the length of said notch, and wherein said adjustable position-fixing mechanism includes an adjustment locking screw with a shaft extending into said notch and engaging said hardened strip at a selected position therealong.

5. The plaque alignment tool according to claim 4, wherein said elongated pivotal portion of said guide member includes an upstanding portion to which is operatively coupled said adjustable position-fixing mechanism, said mechanism including an adjustment locking screw and a bearing gib, said screw engaging said bearing gib and said gib in turn engaging said upstanding portion of said guide member.

6. The plaque alignment tool according to claim 1, wherein said stationary portion of said guide member includes a rectaliniar scale, and wherein said arm member includes an index pointer adjacent said scale.

7. The plaque aignment tool according to claim 1, wherein each of said finger members includes a plate-registering movable register plate having an elongated notch adjustment hole.

* * * * *